(12) United States Patent
Pohlman (10) Patent No.: US 7,527,187 B2
(45) Date of Patent: May 5, 2009

(54) TITANIUM BRAZE FOIL

(75) Inventor: Matthew J. Pohlman, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 591 days.

(21) Appl. No.: 11/018,339

(22) Filed: Dec. 20, 2004

(65) Prior Publication Data
US 2006/0131359 A1    Jun. 22, 2006

(51) Int. Cl.
B23K 35/14    (2006.01)

(52) U.S. Cl. ..................... 228/56.3; 228/246

(58) Field of Classification Search ............. 228/193, 228/56.3, 245, 246; 148/23, 24, 25; 420/492, 420/414, 415, 416, 417
See application file for complete search history.

(56) References Cited

U.S. PATENT DOCUMENTS

| | | | |
|---|---|---|---|
| 3,652,237 A | 3/1972 | Mizuhara | |
| 4,026,677 A | 5/1977 | Galasso et al. | |
| 4,034,454 A * | 7/1977 | Galasso et al. | 428/576 |
| 4,426,033 A | 1/1984 | Mizuhara | |
| 4,725,509 A | 2/1988 | Ryan | |
| 4,871,622 A * | 10/1989 | Rabinkin | 428/576 |
| 6,149,051 A | 11/2000 | Vollmer et al. | |
| 6,475,637 B1 | 11/2002 | Strutt et al. | |
| 6,534,194 B2 | 3/2003 | Weihs et al. | |
| 6,722,002 B1 * | 4/2004 | Chang et al. | 29/17.2 |
| 6,758,388 B1 * | 7/2004 | Leholm et al. | 228/181 |
| 6,783,870 B2 | 8/2004 | Haynes et al. | |
| 6,913,184 B2 * | 7/2005 | Dockus et al. | 228/56.3 |
| 2004/0134966 A1 * | 7/2004 | Chang et al. | 228/56.3 |

FOREIGN PATENT DOCUMENTS

| | | | |
|---|---|---|---|
| EP | 0380200 | | 8/1990 |
| EP | 0940215 | | 9/1999 |
| JP | 04-006173 | * | 1/1992 |

* cited by examiner

Primary Examiner—Jessica L Ward
Assistant Examiner—Michael Aboagye
(74) Attorney, Agent, or Firm—Oral Caglar, Esq.

(57) ABSTRACT

The present invention provides a braze foil comprising titanium and zirconium layers covered by one or more layers of copper, nickel or an alloy of copper and nickel such that neither the zirconium or titanium layers are exposed to the atmosphere. The braze foil may further be layered onto a base material during production to form a braze-clad base material. Methods for brazing a base material with the braze foil are also provided.

5 Claims, 7 Drawing Sheets

TITANIUM BRAZE FOIL

BACKGROUND OF THE INVENTION

The present invention relates generally to titanium braze foils and more particularly to titanium braze foils with zirconium.

Braze alloys based on titanium (Ti) are useful for braze components that consist of titanium, nickel (Ni) and/or iron/steel (Fe) based elements or alloys, among other uses. Thin gauge braze sheets or foils have proven useful for preplacing filler metal in braze joints and/or for bonding to base metal materials to form a clad base-metal structure that has its own braze filler on the surface. The lower melting points of common Ti-based braze alloys cause a beneficial minimum effect on the microstructures and mechanical properties of the brazed components. Furthermore, Ti-based braze alloys tend to provide corrosion resistance that is superior to conventional copper (Cu) or silver (Ag) based braze alloys.

Ti alloys undergo microstructural changes when they are processed above their beta transus. The beta transus of Ti alloys refers to the temperature at which Ti undergoes a complete phase transformation from an alpha plus beta microstructure to an all beta structure or vice versa and results in crystal structure changes. Those microstructural changes can be harmful to the material properties, causing grain growth, reduced fatigue resistance and reduced ductility. Additionally, during brazing the molten braze filler reacts with the parent metal, dissolving it and diffusing into it, which can cause unwanted changes in the parent metal and brazed joint properties. The brazing temperature has to be kept as low as possible and holding time has to be minimized as well to avoid the aforementioned changes in the properties and structure of the part being brazed.

The addition of Zr to the Ti—Cu—Ni braze alloy allows melting (brazing) to occur at lower temperatures than does a Ti—Cu—Ni braze alloy without Zr. The lowered brazing temperature results in reduced undesirable microstructure changes in the brazed parts after brazing. Reduced microstructure changes cause less embrittlement of the brazed parts. Because embrittlement is detrimental to the ductility and fatigue resistance of the brazed parts, the use of a Ti—Cu—Ni braze alloy with added Zr, and the concomitant lowered brazing temperature, may result in brazed materials with better mechanical properties than would otherwise be obtained using a Ti—Cu—Ni braze alloy without added Zr.

U.S. Pat. No. 6,149,051 discloses a braze alloy of 40Ti-20Zr-20Cu-20Ni in the form of a homogenous mixed powder braze filler. While useful for smaller applications, powder braze fillers may present problems when brazing large sheet metal products. The filler must be uniformly coated onto the parent metal sheets which require special equipment.

U.S. Pat. No. 6,475,637 discloses a Ti—Ni—Cu braze foil comprising 10.5-12.5 wt % Zr which is formed by rapid solidification to produce a homogeneous thin foil. The rapid solidified foil is limited in the width, length and quantity of the foil. Furthermore, the manufacture of the braze foil by rapid solidification can be relatively expensive.

As can be seen, there is a need for braze foils and sheets made of an alloy of Ti, Zr and other metals that would have a low melting point and be useful for brazing large sheet metal products. It would also be desirable if such braze foils and sheets could be manufactured easily and inexpensively.

SUMMARY OF THE INVENTION

In one aspect of the present invention there is provided a braze sheet or foil comprising a core comprising at least one layer of titanium and at least one layer of zirconium; and at least one covering layer comprising commercially pure copper, a copper alloy, commercially pure nickel, a nickel alloy or mixtures thereof, wherein the covering layer has a metallurgical bond with said core.

In another aspect of the present invention there is provided a braze sheet or foil comprising a first metallic layer; a second metallic layer; and a core comprising titanium and zirconium wherein the core is between the first and the second metallic layers.

In yet another aspect of the present invention there is provided a braze sheet or foil comprising a first metallic layer; a second metallic layer; a third metallic layer; a fourth metallic layer; a fifth metallic layer; a sixth metallic layer, and a core comprising titanium wherein the first, second and third metallic layers are layered on one side of the core and the fourth, fifth, and sixth layers are layered on another side of the core and wherein at least one of the first, second, third, fourth, fifth or sixth layer comprises zirconium.

In a further aspect of the present invention there is provided a braze sheet or foil comprising a first metallic layer; a metallic second layer, the second layer metallurgically bonded to the first layer; a third metallic layer, the third layer metallurgically bonded to the second layer and wherein the third layer comprises zirconium; a core layer, the core layer metallurgically bonded to the third layer and wherein the core layer comprises titanium; a fourth layer, the fourth layer metallurgically bonded to the core layer and wherein the fourth layer comprises zirconium; a fifth layer, the fifth layer metallurgically bonded to the fourth layer; and a sixth layer, the sixth layer metallurgically bonded to the fifth layer.

In another aspect of the present invention there is provided a braze sheet or foil comprising a first layer, the first layer comprising either copper or nickel; a second layer, the second layer metallurgically bonded to the first layer and wherein the second layer comprises the other of either copper or nickel; a third layer, the third layer metallurgically bonded to the second layer and wherein the third layer comprises zirconium; a core layer, the core layer metallurgically bonded to the third layer and wherein the core layer comprises titanium; a fourth layer, the fourth layer metallurgically bonded to the core layer and wherein the fourth layer comprises zirconium; a fifth layer, the fifth layer metallurgically bonded to the fourth layer and wherein the fifth layer comprises either copper or nickel; and a sixth layer, the sixth layer metallurgically bonded to the fifth layer and wherein the sixth layer comprises the other of either copper or nickel.

In a yet another aspect of the present invention there is provided a braze sheet or foil comprising a first layer comprising nickel, copper or mixtures thereof; a second layer comprising titanium or zirconium; a third layer comprising nickel, copper or mixtures thereof; a core layer comprising titanium or zirconium; a fourth layer comprising nickel, copper or mixtures thereof; a fifth layer comprising titanium or zirconium; a sixth layer comprising nickel, copper or mixtures thereof; and wherein at least one of the layers comprises zirconium and at least one of the layers comprises titanium.

In a further aspect of the present invention there is provided a braze-clad base material comprising a base material; and a braze sheet or foil metallurgically bonded to the base material, the braze sheet or foil comprising a first layer comprising nickel, copper or mixtures thereof, a second layer comprising titanium or zirconium, a third layer comprising nickel, copper or mixtures thereof, a core layer comprising titanium or zirconium, a fourth layer comprising nickel, copper or mixtures thereof, a fifth layer comprising titanium or zirconium, a sixth layer comprising nickel, copper or mixtures thereof and wherein at least one of the layers comprises zirconium and at least one of the layers comprises titanium.

In yet another aspect of the present invention there is provided a method for brazing a base material comprising the steps of placing a braze sheet or foil between two base materials to be joined together, the braze sheet or foil comprising a first metallic layer, a second metallic layer and a core comprising titanium and zirconium wherein the core is between the first and the second metallic layers; heating the braze material and base materials to a brazing temperature; and forming a braze joint between the braze sheet or foil and the base materials.

In yet another aspect of the present invention there is provided a method for brazing a base material comprising the steps of placing a braze sheet or foil between two base materials to be joined together, the braze sheet or foil comprising a first layer comprising nickel, copper or mixtures thereof, a second layer comprising titanium or zirconium, a third layer comprising nickel, copper or mixtures thereof, a core layer comprising titanium or zirconium, a fourth layer comprising nickel, copper or mixtures thereof, a fifth layer comprising titanium or zirconium, a sixth layer comprising nickel, copper or mixtures thereof and wherein at least one of the layers comprises zirconium and at least one of the layers comprises titanium; heating the braze material and base materials to a brazing temperature; and forming a braze joint between the braze sheet or foil and the base materials.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides titanium braze sheets and/or foils that may comprise layers of zirconium and titanium, structural base metal sheet with those braze sheets and/or foils clad to the surface, as well as methods for using the braze sheets and/or foils for brazing base materials. A "foil" is known in the art to be of a thickness less than a sheet, and the common definition of "foil" is a "very thin sheet metal". As used herein, a foil is taken to have a thickness less than about 0.005 inches, and thus the term "sheet" is used to designate situations where the thickness is greater than about 0.005 inches. In all other properties, i.e. composition and methods of use, the terms "foil" and "sheet" as well as "strip" are used interchangeably herein. In its most basic embodiment, the braze foils may comprise a core layer of titanium and zirconium and at least one other layer that may cover the core layer. The other layer may comprise commercially pure copper, a copper alloy, commercially pure nickel, a nickel alloy or mixtures thereof. The core layer of zirconium and titanium may comprise discrete layers of zirconium and titanium. The braze foils may also comprise more than these two layers. The number of layers may be determined by the desired melting properties, the desired thickness, and the application that the foil will be used in. The braze foils of the present invention are suitable for applications wherever a braze foil with low melting point is required, such as, but not limited to, aerospace industry.

Braze foils must have a lower melting temperature than the base materials to which they are applied. Newer, lighter weight alloys such as, but not limited to, titanium alloy require braze foils that may be brazed at a low temperature while retaining good flow and coverage characteristics. The addition of zirconium to braze alloys, such as Ti—Cu—Ni, lowers the melting point. Presently, braze alloys of Ti—Zr—Ni—Cu are either in a mixed, homogenous powder form or in a homogenous foil, usually formed by rapid solidification of the melted powder form. The powder and homogenous foil forms of Ti—Zr—Ni—Cu braze alloys, while performing well in brazing applications, may be difficult to use and/or costly to manufacture. The braze foil of the present invention may comprise metallic layers of titanium, zirconium, nickel and/or copper that may be readily bonded together to form the braze foil without any intermediate heating. Brazing base materials with the layered braze foils may result in a braze alloy of composition according to the weight-percentage of the individual sheets. Furthermore the resulting braze alloy may form a different metallurgical bond and/or crystalline structure compared to the powder and homogenous foils of the prior art.

The addition of Zr to a Ti/Cu/Ni braze alloy may result in a lower melting (brazing) temperature. Furthermore, the layering arrangement of metals in the braze foils can be ordered in such a way that the reactive components, Ti and Zr, may not be exposed during the temperature ramping state of the brazing process. For example, exposed, reactive Ti may react with the atmosphere during brazing to form, for example, Ti oxide, hydride or nitride when the atmosphere contains oxygen, hydrogen and/or nitrogen. The homogenous compositions of the braze foils known in the art require brazing in an inert atmosphere or in a vacuum to prevent reaction of Ti with the atmosphere.

Figure 1:
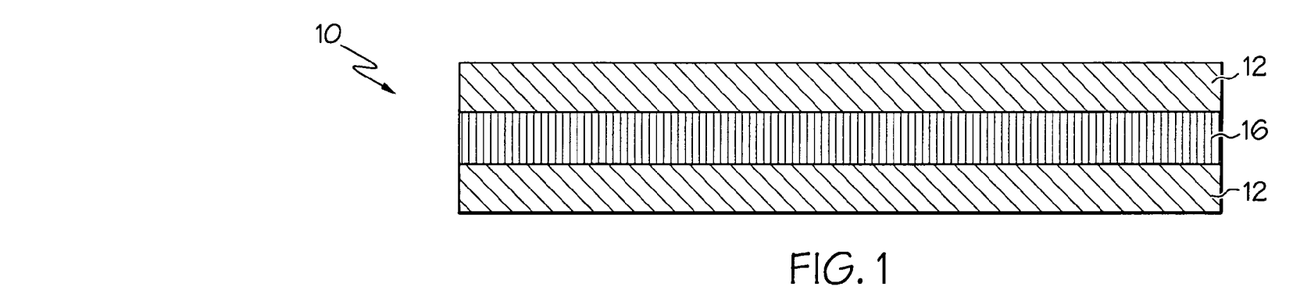
FIG. 1 is a block diagram showing a first example of a braze sheet or foil according to the invention.

The braze foil of the present invention may comprise a plurality of layers where the layers may be metallurgically bonded to each other. The only limitation on the number of layers may be the desired thickness and composition of the braze foil. In one exemplary embodiment, shown in FIG. 1, braze foil 10 may also comprise a core layer 16 comprising at least one layer of zirconium and at least one layer of titanium as well as a covering layer 12 where the covering layer 12 covers the core layer 16 such that core layer 16 is not exposed to the atmosphere. The covering layer 12 may form a metallurgical bond with the core layer 16. In an illustrative embodiment, the covering layer 12 may comprise commercially pure (CP) copper, a copper alloy, CP nickel, a nickel alloy, a copper/nickel alloy or mixtures thereof. The core layer 16 may comprise, for example, one layer of zirconium and one layer of titanium.

Figure 2A:
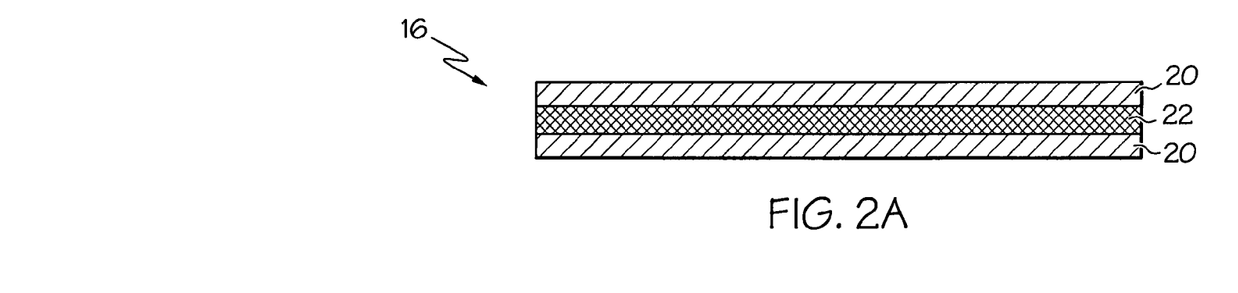
FIG. 2A is a block diagram showing a first example of the core layer of the braze sheet or foil of FIG. 1 according to the invention.

Alternatively, as shown in FIG. 2A the core layer may comprise a first layer 22 of titanium between two second layers 20 of zirconium or a first layer 22 of zirconium between two second layers 20 of titanium. The core layer 16 may further comprise at least two layers each of titanium and zirconium where the zirconium and titanium layers are arranged in an alternating arrangement as illustrated in FIG. 2B.

Figure 2B:
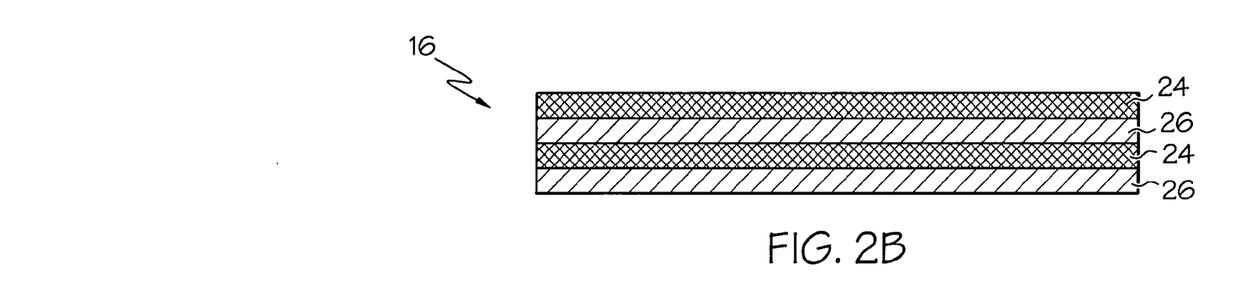
FIG. 2B is a block diagram showing a second example of the core layer of the braze sheet or foil of FIG. 1 according to the invention.

In FIG. 2B, core layer 16 may comprise first layer 24 of either zirconium or titanium which alternates with a second layer 26 of the other of zirconium or titanium. It will be appreciated that although the figures show layers of equal thickness for illustrative purposes, the layers need not be of uniform thickness. Actual individual layer thickness will depend on the composition of the material in the individual layer, the molecular weight or density of the elements in the individual layer, the desired composition (weight %) of the finished braze foil, and the desired total thickness of the finished braze foil. In one embodiment, the layers may have individual thickness of from about 0.00005 inches to about 0.015 inches with a total braze foil thickness of from about 0.0005 inches to about 0.020 inches. In another illustrative embodiment, the layers may have individual thickness of from about 0.0001 inches to about 0.0015 inches with a total braze foil thickness of from about 0.0010 inches to about 0.0020 inches. Exemplary embodiments of the arrangement of layers in the braze foil may be, but not limited to Cu/Ti/Zr/Cu, Cu/Ti/Zr/Ti/Cu, Cu/Zr/Ti/Zr/Cu, Cu/Zr/Ti/Zr/Ti/Cu, Ni/Ti/Zr/Ni, Ni/Ti/Zr/Ti/Ni, Ni/Zr/Ti/Zr/Ni, Ni/Zr/Ti/Zr/Ti/Ni, Cu/Ti/Zr/Ni, Cu/Zr/Ti/Zr/Ni, Cu/Ti/Zr/Ti/Ni, Cu/Zr/Ti/Zr/Ti/Ni or Ni—Cu/Zr/Ti/Zr/Ni—Cu where Ni—Cu represents a nickel-copper alloy. It is contemplated that either the Cu or Ni layer may be replaced by a Cu/Ni alloy. In one illustrative embodiment, the composition of the braze foil may be, but not limited to, about 25 wt % Ti, about 50 wt % Cu and about 25 wt % Zr. In an alternate, non-limiting illustrative embodiment, the composition may be about 12.6 wt % zirconium, 15.4 wt % Ni and about 72 wt % Ti. In another non-limiting illustrative embodiment, the composition may be about 20 wt % zirconium, 20 wt % Ni, 20 wt % Cu and about 40 wt % Ti. In a further illustrative embodiment, the composition of the braze foil may comprise from about 10 wt % to about 72 wt % Zr.

Figure 3:
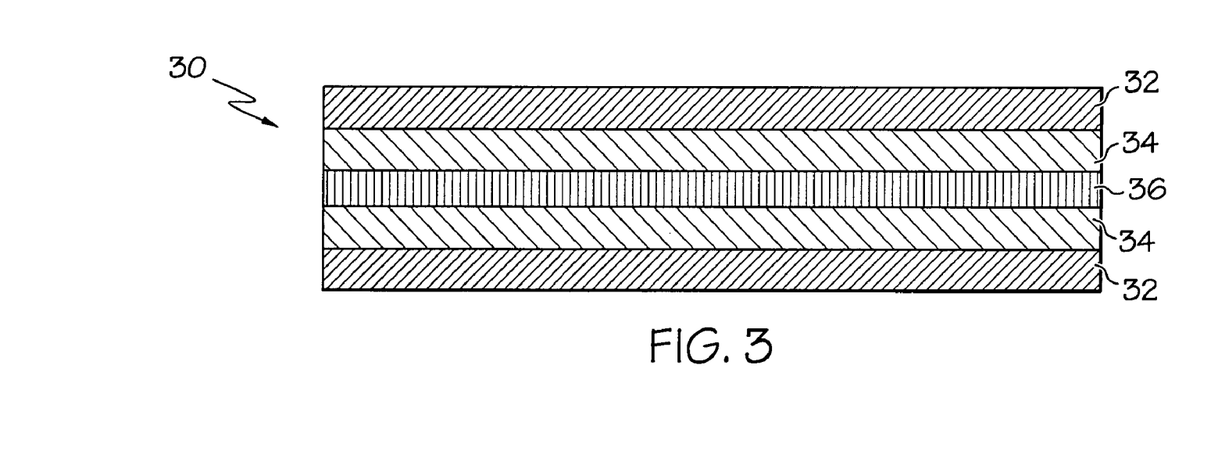
FIG. 3 is a block diagram showing a second example of a braze sheet or foil according to the invention.

Braze foil 10 may further comprise a second covering layer to produce braze foil 30 shown in FIG. 3. Braze foil 30 comprises a core layer 36 surrounded by a first covering layer 34 and a second covering layer 32. The core layer 36 may comprise at least one layer of zirconium and one layer of titanium while the first covering layer 34 and the second covering layer 32 may comprise commercially pure (CP) copper, a copper alloy, CP nickel, a nickel alloy, a copper/nickel alloy or mixtures thereof. It is contemplated that first covering layer 34 and second covering layer 32 will have different compositions. By way of non-limiting example, the first covering layer 34 may comprise CP copper or a copper alloy while the second covering layer 32 may comprise CP nickel or a nickel alloy.

Figure 4:
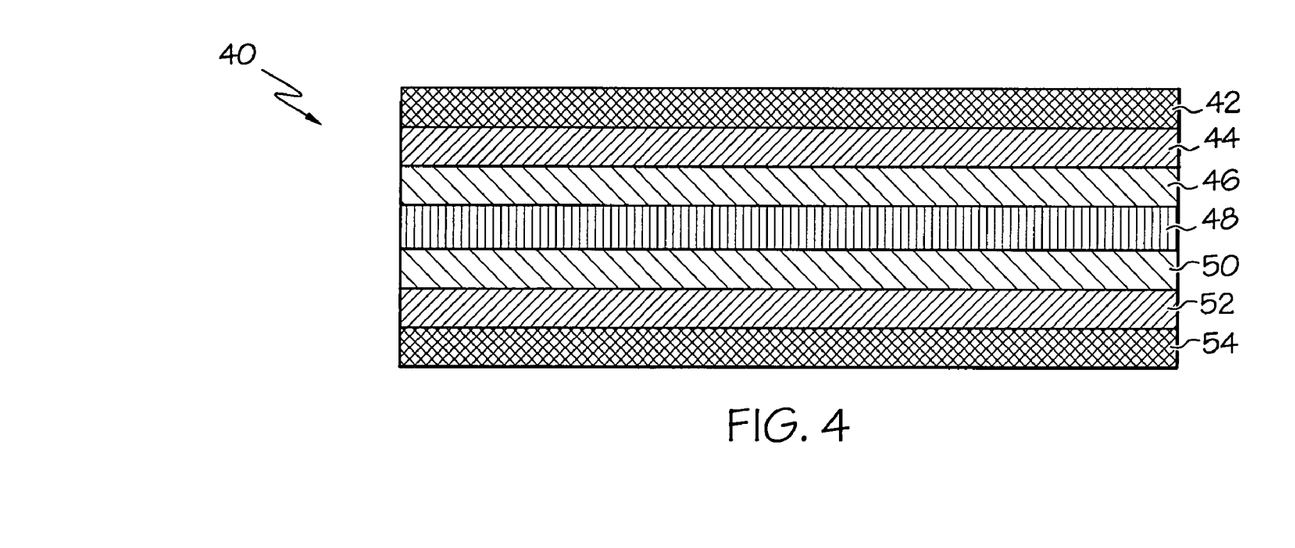
FIG. 4 is a block diagram showing a third example of a braze sheet or foil according to the invention.

The braze foils of the present invention may further comprise additional layers. The arrangement and/or composition of the layers may vary, resulting in a number of possible combinations of layers. By way of non-limiting example, braze foil 40 of FIG. 4 may comprise a first 42, second 44, third 46, fourth 50, fifth 52 and sixth 54 layers with a core layer 48 between the first 42, second 44 and third 46 layers on one side of core layer 48 and the fourth 50, fifth 52 and sixth 54 layers on the other side. For example, the first 42 and sixth 54 layers may be, but not limited to CP copper, copper alloy, CP nickel, nickel alloy, a copper/nickel alloy or mixtures thereof. Additionally, the second 44, third 46, fourth 50 and fifth 52 layers may be, but not limited to, CP copper, copper alloy, CP nickel, nickel alloy, a copper/nickel alloy, zirconium or titanium while the core layer may be zirconium or titanium. Braze foil 40 may comprise at least one layer of titanium and one layer of zirconium Exemplary embodiments of the arrangements of the layers may be, but not limited to, Cu/Zr/Ni/Ti/Zr/Ni/Cu, Ni/Zr/Cu/Ti/Cu/Zr/Ni, Cu/Ni/Zr/Ti/Zr/Ni/Cu, Cu/Zr/Ni/Ti/Cu/Zr/Ni, Ni/Cu/Zr/Ti/Zr/Cu/Ni or Cu/Ti/Ni/Ti/Zr/Cu/Ni. It will be appreciated that there are any number of viable arrangements of the layers and, as the number of layers increases, the number of permutations increases exponentially. For example, a braze foil with greater than seven layers may have the layers arranged as (Cu or Ni)/Zr/(Cu or Ni)/Zr/Ti/Zr/(Cu or Ni)/Ti/Zr/(Cu or Ni).

In one illustrative embodiment, the braze foil may have a composition of about 40 wt % titanium, about 20 wt % copper, about 20 wt % nickel and about 20 wt % zirconium. In an alternative illustrative embodiment, the composition of the braze foil may be about 37.5 wt % titanium, 15 wt % copper, 15 wt % nickel and 37.5 wt % zirconium. In a non-limiting embodiment, the braze foil may comprise from about 10 wt % to about 72 wt % zirconium.

The layers of the braze foil may be clad to form the foils by cold or hot roll bonding. Roll bonding may typically be carried out in a bonding mill that provides sufficient pressure to form a metallurgical bond even without heat treating (such as annealing, for example) between the dissimilar materials. In one embodiment, the cold rolling process of U.S. Pat. No. 6,722,002, hereby incorporated by reference, may be used to produce the braze foils of the present invention. The process may involve taking an individual strip, or multiple strips, of Ti and Zr with a strip, or multiple strips, comprised of CP Cu and/or Ni, alloys thereof, or combinations thereof, placed on both sides of the Ti or Zr strip. The thus-placed strips may then be processed, such as being cold-worked by processing with a rolling machine, for example, to the desired thickness, resulting in a roll bonded, multi-layered alloy strip. Strips having 5, 6, 7, or more layers may be formed and the layers may be arranged in any desired configuration such as, but not limited to, the exemplary embodiments of the present invention. Thus, an individual strip of the multi-layered alloy strip may be placed next to, and on both sides of, an individual strip, or multiple strips, of Ti and Zr or some other layer or multi-layer strip. The thus-placed strips may then be processed, such as being cold-worked by processing with a rolling machine, for example, to the desired thickness, resulting in a roll bonded, multi-layered alloy sheet or foil useful for various brazing applications.

Other methods of forming the multi-layered braze sheets or foils with Zr added may also include starting with a core of Ti or Ti alloy, coating the core (using coating methods known in metallurgy practice) with at least one or more layers of one or more of Cu, a Cu alloy, Ni, or a Ni alloy. This multi-layer system may then be coated with at least one or more layers of Zr, with or without intermediate cold-working steps. Further coating of the resulting multi-layer system with at least one or more layers of one or more of Cu, a Cu alloy, Ni, or a Ni alloy, with or without intermediate cold-working steps may be performed. The resulting multi-layered composite may then be cold-worked to the desired thickness to a thin sheet or foil. It should be understood that the arrangement of layers above is meant only as an illustration and that the method may be used to produce any desired arrangement of the layers.

Similarly, other methods of forming the multi-layered braze sheets or foils with Zr added may also include starting with a core of Zr or Zr alloy, coating the core using coating methods known in metallurgy practice with at least one or more layers of one or more of Cu, a Cu alloy, Ni, or a Ni alloy. Then at least one or more layers of Ti, with or without intermediate cold-working steps may be layered on followed by coating with at least one or more layers of one or more of Cu, a Cu alloy, Ni, or a Ni alloy, with or without intermediate cold-working steps. The resulting multi-layered composite may then be cold-worked to the desired thickness to a thin sheet or foil. It should be understood that the arrangement of layers above is meant only as an illustration and that the method may be used to produce any desired arrangement of the layers.

The present invention also provides a braze-clad base material that may comprise a base material with the braze foil of the present invention bonded to the base material prior to brazing. The base material may be, but not limited to, titanium alloys, nickel alloys and stainless steel. The base material may be chosen to have a higher melting temperature than the braze foil. During the brazing process the braze foil may melt but not the base material. Any of the braze foils contemplated by the present invention may be bonded to the base material by a metallurgical bond prior to brazing such as during the production of the base material and/or the braze foil. In one illustrative embodiment, the braze-clad base material may have a layer of the base material between two layers of braze foil. In an alternative embodiment, the braze-clad base material may have a layer of braze foil on one side of the base material.

Figure 9:
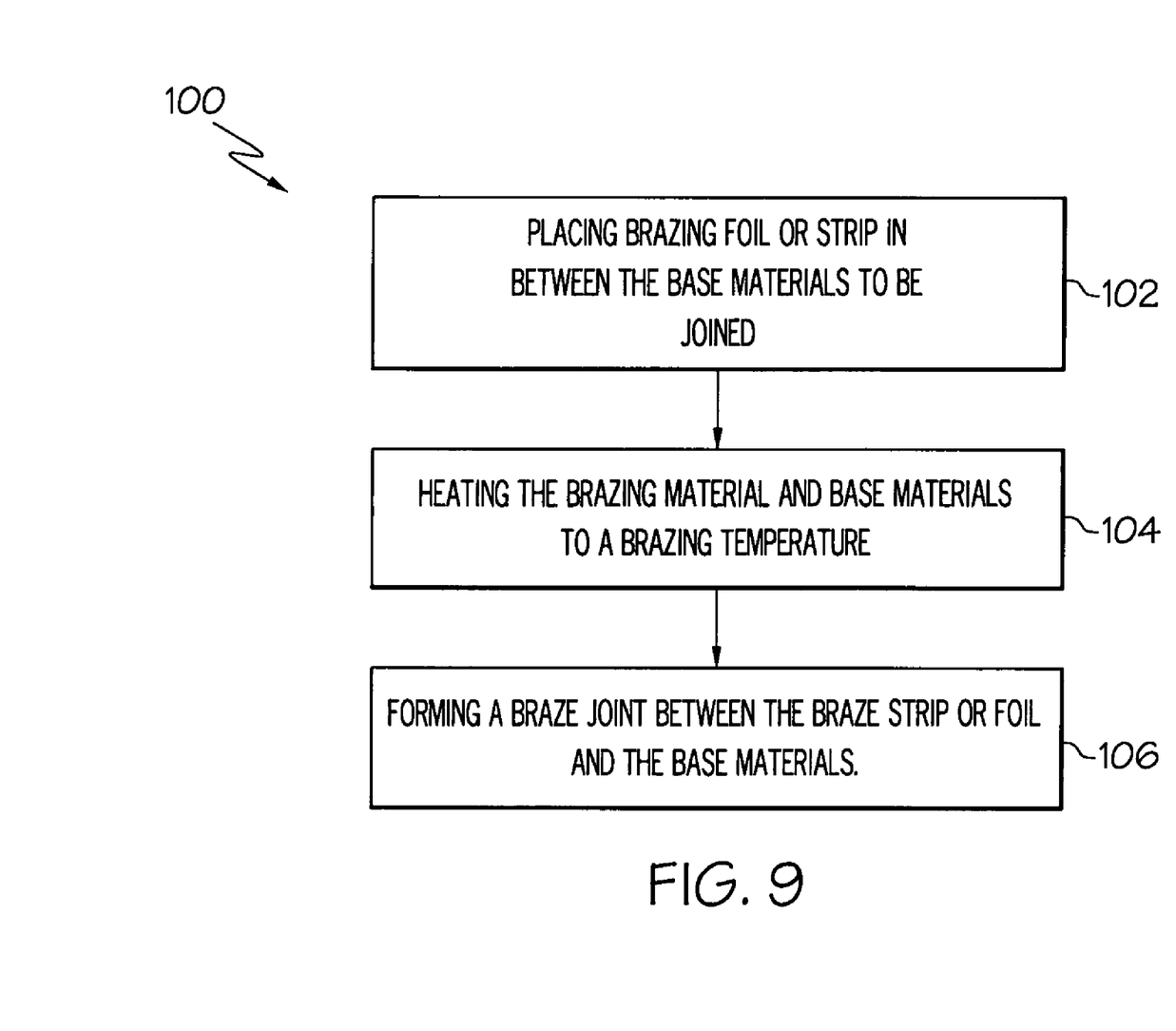
FIG. 9 is a flow chart showing a method of brazing a base material, according to the invention.

A method for using the braze foils of the present invention to braze base materials is provided. Method 100, illustrated in FIG. 9, may comprise step 102 of placing a braze sheet or foil between two base materials to be joined together. The braze sheet or foil may comprise a first metallic layer, a second metallic layer and a core comprising titanium and zirconium wherein the core is between the first and the second metallic layers. Method 10 may further comprise step 104 of heating the braze material and base materials to a brazing temperature. The rate of temperature increase to reach the braze temperature may be from about 1° C./min to about 10° C./min. Method 10 then may comprise step 106 of forming a braze joint between the braze sheet or foil and the base materials. After the braze joint is formed, the braze joint may be cooled. Although not necessary, after the brazing temperature is reached, the temperature may be held for a desired amount of time before cooling the braze joint to allow diffusion of the various elements into the base material. Finally, the braze joint may be solidified.

It will be appreciated that the brazing temperature will be dependent on the melting temperature of the braze foil which, in turn, is dependent on the composition of the braze foil. For example, if the braze foil has a composition of about 40 wt % Ti, about 20 wt % Cu, about 20 wt % Ni and about 20 wt % Zr, the melting temperature may be about 864° C. (1587° F.) (See, for example, FIG. 5). The brazing temperature may then be from about 840° C. to about 950° C.

Differential Thermal Analysis (DTA) is a technique that may be used to characterize the solidus and liquidus of roll bonded Ti—Zr—Ni—Cu alloys wherein the solidus is the temperature at which 100% of the alloy is in a solid crystalline form and liquidus the temperature at which it is in a fluid, non-crystalline form. The information may be useful to determine the brazing temperature in brazing applications. Typical heating and cooling DTA curves of 40Ti-20Zr-20Ni-20Cu (actual weight % of sample: 39Ti-21.6Zr-19.1Ni-19.6Cu-0.1Fe) are shown in FIGS. 5-8.

Figure 5:
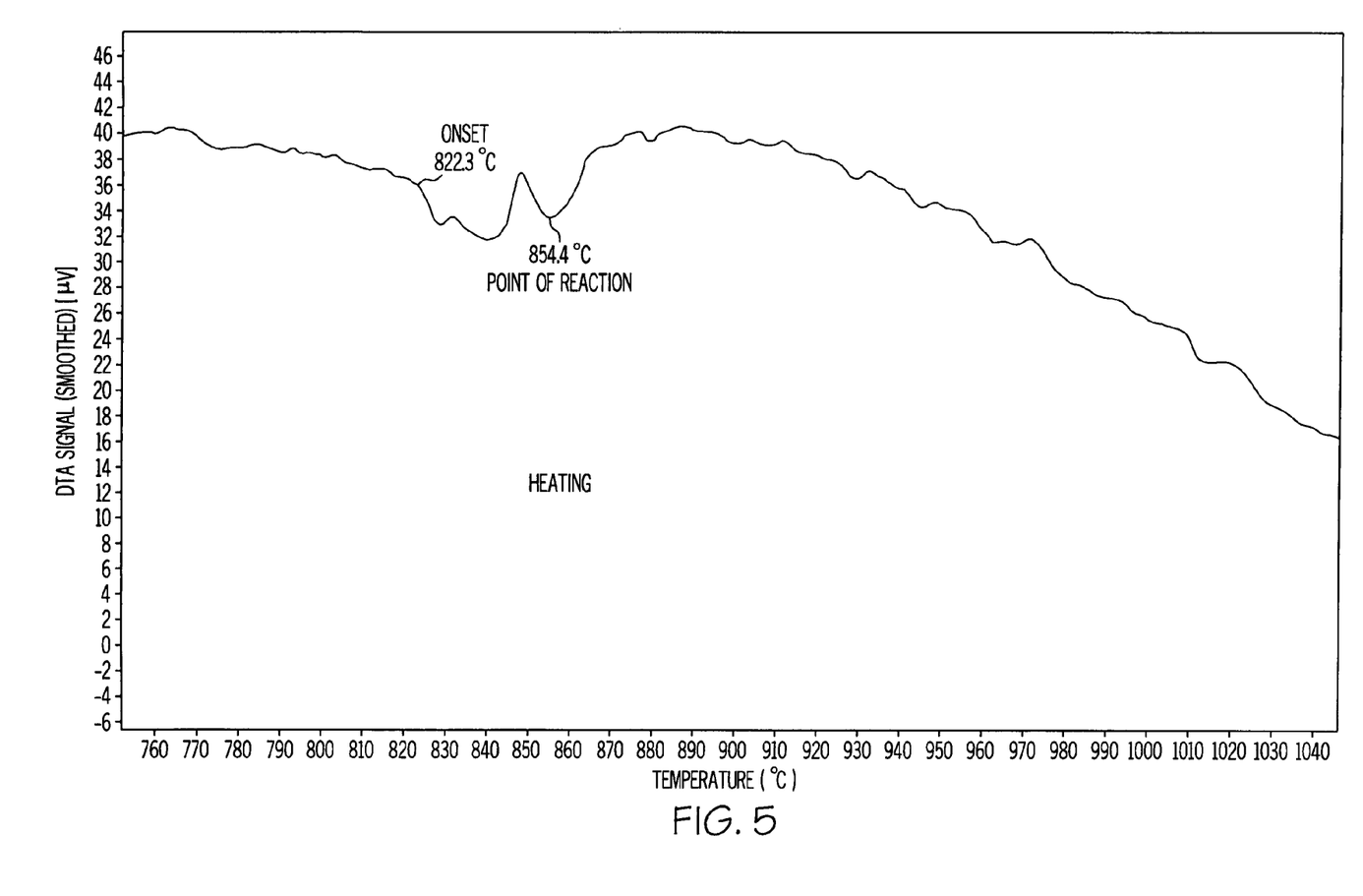
FIG. 5 shows the Differential Thermal Analysis (DTA) heating curve for a one-phase heating step of Ti20Zr20Cu20Ni, according to the invention.
Figure 6:
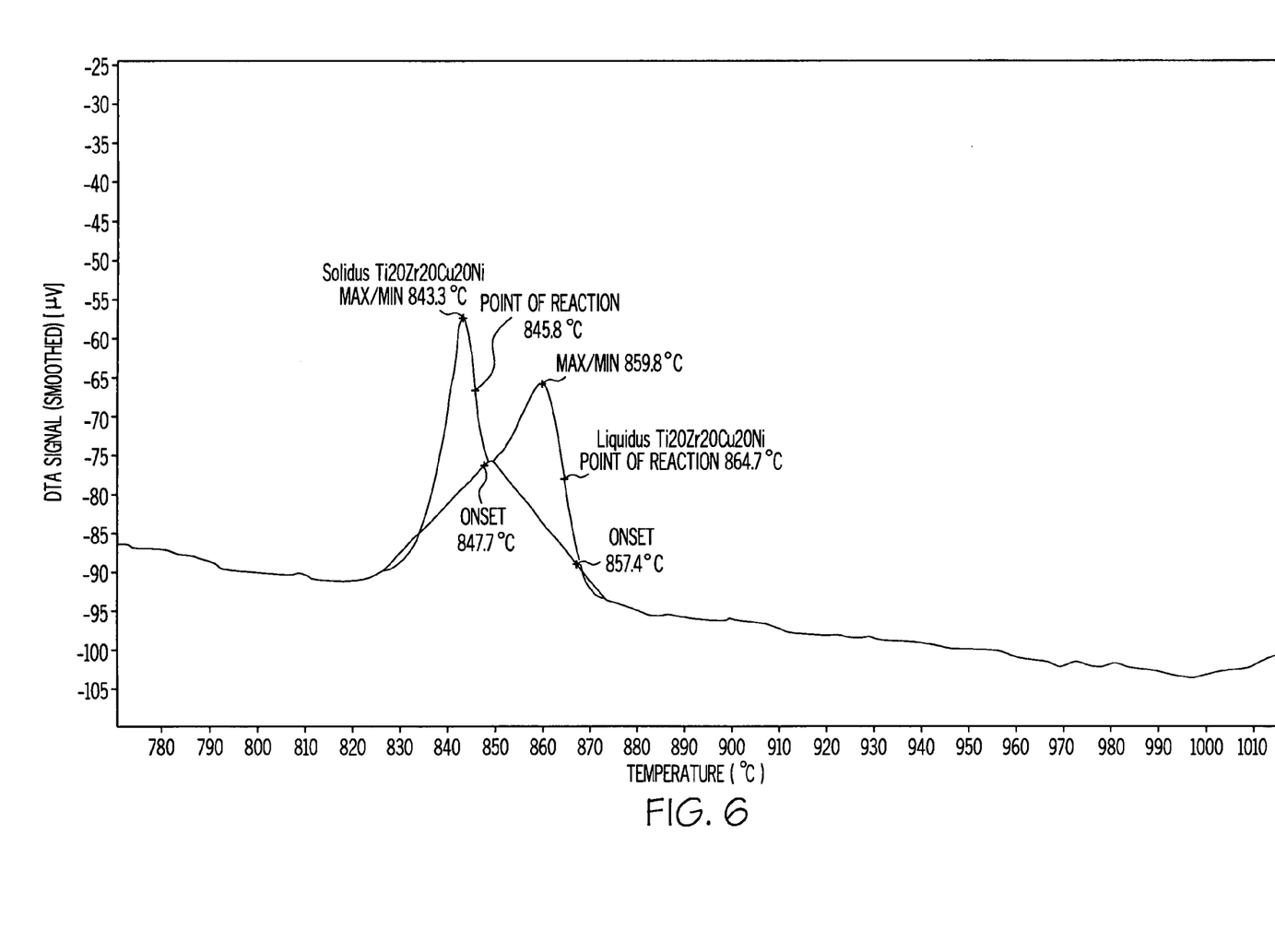
FIG. 6 shows the DTA cooling curve for Ti20Zr20Cu20Ni heated in FIG. 5, according to the invention.

FIGS. 5 and 6 show the heating and cooling curves, respectively, for a 0.002 inch thick foil that was heated to 1050° C. at a rate of 10° C./min and subsequently cooled at a rate of 20° C./min. The liquidus and solidus temperatures are identified from the cooling curve to be 864° C. and 843° C. respectively.

Figure 7:
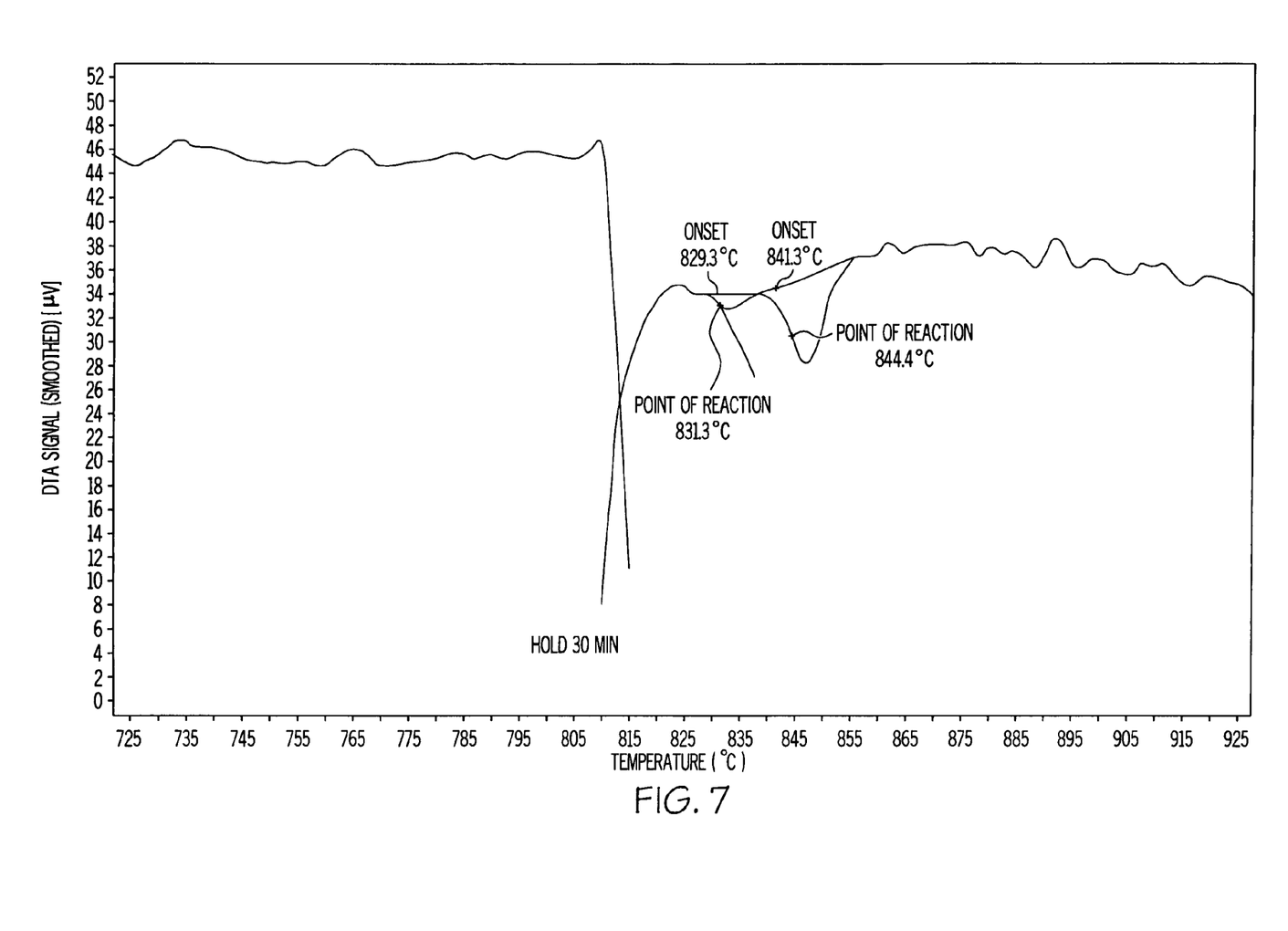
FIG. 7 shows the DTA heating curve for a two-phase heating step of Ti20Zr20Cu20Ni, according to the invention.
Figure 8:
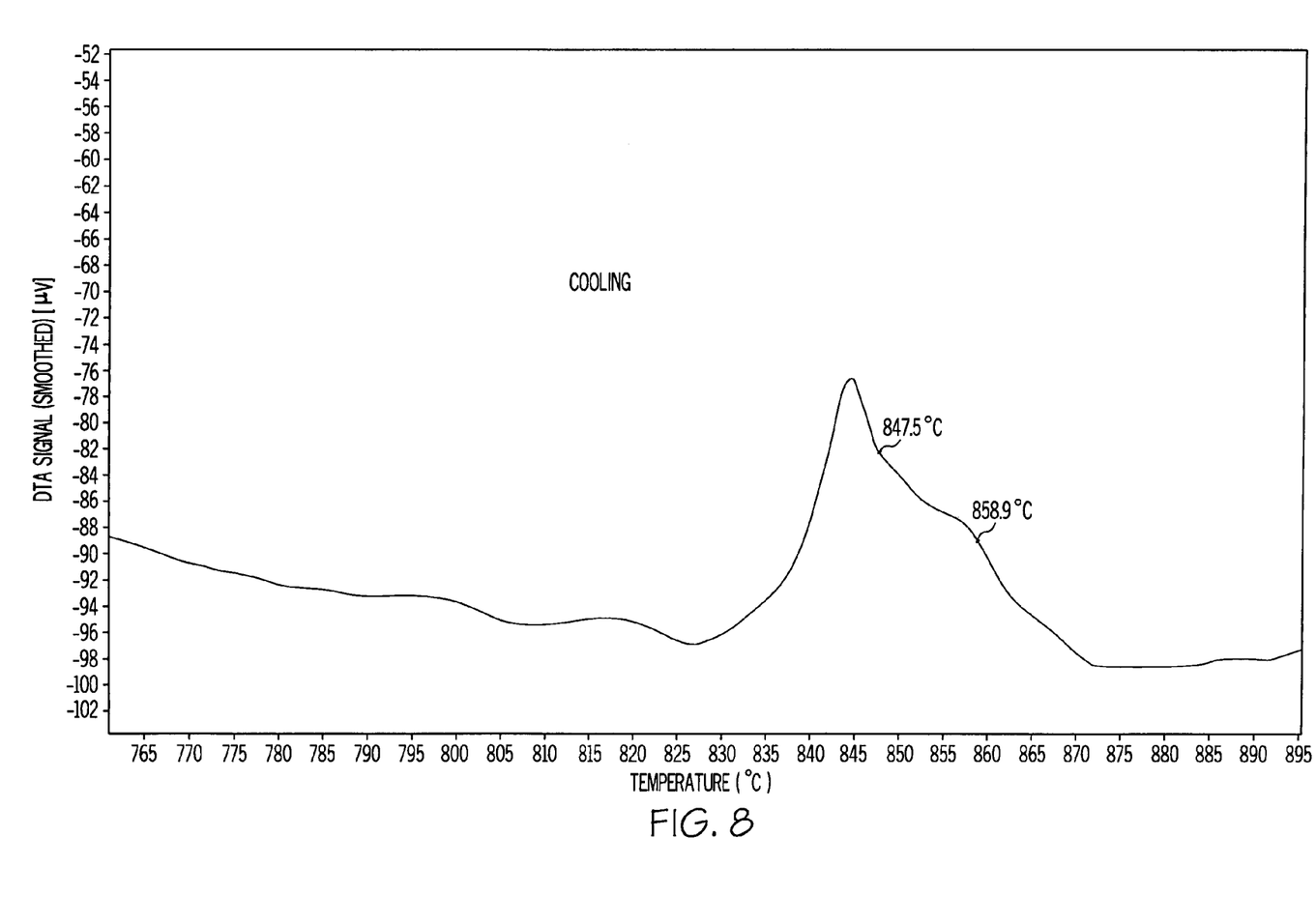
FIG. 8 shows the DTA cooling curve for Ti20Zr20Cu20Ni from FIG. 7, according to the invention.

FIGS. 7 and 8 show the heating and cooling curves, respectively, for a 0.0016 inch thick foil that was heated to 800° C. at a rate of 10° C./min, the temperature then held for 30 minutes, then raised to 950° C. at a rate of 5° C./min and finally cooled at a rate of 20° C./min. The liquidus temperature is the same under these conditions as those of FIGS. 5 and 6.

It should be understood, of course, that the foregoing relates to exemplary embodiments of the invention and that modifications may be made without departing from the spirit and scope of the invention as set forth in the following claims.

I claim:

1. A method for brazing a base material comprising the steps of:
   placing a braze sheet or foil between two base materials to be joined together, the braze sheet or foil comprising a first layer comprising nickel, copper or mixtures thereof, a second layer comprising titanium or zirconium, a third layer comprising nickel, copper or mixtures thereof, a core layer comprising titanium or zirconium, a fourth layer comprising nickel, copper or mixtures thereof, a fifth layer comprising titanium or zirconium, a sixth layer comprising nickel, copper or mixtures thereof and wherein at least one of the layers comprises zirconium and at least one of the layers comprises titanium;
   heating the braze material and base materials to a brazing temperature; and
   forming a braze joint between the braze sheet or foil and the base materials.

2. The method of claim 1 further comprising the steps of:
   cooling the braze joint; and
   solidifying the braze joint.

3. The method of claim 1 wherein the braze sheet or foil has a composition of about 40 wt% titanium, about 20 wt% zirconium, about 20 wt% copper and about 20 wt% nickel.

4. The method of claim 3 wherein the brazing temperature is from about 840° C. to about 950° C.

5. The method of claim 4 wherein the braze foil or sheet and the base materials are heated to the brazing temperature at a rate of about 1 C./min to about 10° C./min.

\* \* \* \* \*